(12) United States Patent
Karjalainen et al.

(10) Patent No.: US 8,081,717 B2
(45) Date of Patent: Dec. 20, 2011

(54) DELAY ESTIMATION FOR A TIMING ADVANCE LOOP

(75) Inventors: Juha P Karjalainen, Oulu (FI); Markku Vainikka, Kiviniemi (FI); Olli Piirainen, Oulu (FI)

(73) Assignee: Nokia Siemens Networks Oy, Espoo (FI)

( * ) Notice: Subject to any disclaimer, the term of this patent is extended or adjusted under 35 U.S.C. 154(b) by 977 days.

(21) Appl. No.: 12/069,524

(22) Filed: Feb. 11, 2008

(65) Prior Publication Data

US 2009/0202031 A1  Aug. 13, 2009

(51) Int. Cl.
*H04L 27/06* (2006.01)
(52) U.S. Cl. ......................................................... 375/340
(58) Field of Classification Search ................... 375/340, 375/355
See application file for complete search history.

(56) References Cited

U.S. PATENT DOCUMENTS

| | | | | |
|---|---|---|---|---|
| 7,028,232 | B2 | 4/2006 | Kyosti et al. | 714/704 |
| 7,142,585 | B2 * | 11/2006 | Baltersee et al. | 375/148 |
| 7,715,463 | B2 * | 5/2010 | Li | 375/147 |
| 2003/0210752 | A1 * | 11/2003 | Krupka | 375/340 |
| 2003/0227962 | A1 * | 12/2003 | Hintz-Madsen | 375/148 |
| 2004/0017846 | A1 * | 1/2004 | Fernandez-Corbaton et al. | 375/152 |
| 2006/0171491 | A1 * | 8/2006 | Tapaninen et al. | 375/343 |
| 2007/0110174 | A1 * | 5/2007 | Glazko et al. | 375/260 |
| 2008/0165908 | A1 * | 7/2008 | Vrcelj et al. | 375/355 |
| 2008/0267164 | A1 * | 10/2008 | D'Alessandro | 370/350 |
| 2008/0279322 | A1 * | 11/2008 | Franovici et al. | 375/371 |
| 2009/0003491 | A1 * | 1/2009 | Yuan | 375/319 |

FOREIGN PATENT DOCUMENTS

| | | |
|---|---|---|
| EP | 1 763 157 A2 | 3/2007 |
| WO | WO 01/19112 A1 | 3/2001 |

OTHER PUBLICATIONS

"Technical Specification Group Radio Access Network; Evolved Universal Terrestrial Radio Access (E-UTRA) and Evolved Universal Terrestrial Radio Access Network (E-UTRAN); Overall description; Stage 2 (Release 8)", 3GPP TS 36.300 V8.3.0 (Dec. 2007), pp. 1-121.

* cited by examiner

*Primary Examiner* — Jaison Joseph
(74) *Attorney, Agent, or Firm* — Harrington & Smith

(57) ABSTRACT

An apparatus includes a radio frequency receiver and a timing adjustment unit that contains at least two channel impulse response estimators. The at least two channel impulse response estimators include an on-time estimator and at least one of an early estimator and a late estimator. The apparatus also includes a calculation unit that is configurable to obtain a channel estimate for each measured channel impulse response and to average obtained channel estimates over a plurality of received signal events to determine a timing adjustment in accordance with residual signal power.

21 Claims, 10 Drawing Sheets

DELAY ESTIMATION FOR A TIMING ADVANCE LOOP

TECHNICAL FIELD

The exemplary and non-limiting embodiments of this invention relate generally to wireless communication systems, methods, devices and computer programs and, more specifically, relate to techniques to time synchronize a transmitter with a receiver.

BACKGROUND

Various abbreviations that may appear in the specification and/or in the drawing figures are defined as follows:
3GPP third generation partnership project
EDGE enhanced data rates for global evolution
GSM global system for mobile communications
GERAN GSM/EDGE radio access network
GPRS general packet radio service
(E)GPRS enhanced GPRS
UTRAN universal terrestrial radio access network
UE user equipment
MS mobile station
EUTRAN evolved UTRAN (also known as LTE)
LTE long term evolution
OFDMA orthogonal frequency division multiple access
SC-FDMA single carrier, frequency division multiple access
UL uplink
DL downlink
RACH random access channel
LSE least square error
BLER block error rate
SNR signal to noise ratio
BPSK binary phase shift keying
QPSK quadrature phase shift keying
QAM quadrature amplitude modulation
VoIP voice over internet protocol In cellular communication systems, regardless of the multiple access method or modulation method that is used, there is a need for a timing advance loop to exist between a network access node (e.g., a base station or a Node B or, in LTE, an eNB) and a mobile device (e.g., a MS or UE). For example, a timing advance loop is defined for GSM/EDGE systems, OFDMA systems, as well as for SC-FDMA systems, such as the LTE system. The purpose of the timing advance loop is to enable the alignment of UL signals (transmissions from a mobile device) at the network access node within some time resolution. By time aligning the UL signals the network access node receiver design can be relaxed somewhat, and in some multiple access schemes, such as in OFDMA, signal orthogonality between UL transmissions from a plurality of mobile devices can be maintained with greater ease.

A general procedure for initial synchronization may be summarized as follows:

1. The mobile device synchronizes to a base station DL transmission to achieve a rough estimate of timing synchronization. The effect of signal propagation delay is not included in this estimate.

2. The mobile device sends a message (e.g., a RACH message) which the base station detects and estimates timing from.

3. The base station signals the mobile device to adjust its timing so that subsequent transmissions are aligned at the base station receiver.

4. The mobile device adjusts the transmission timing accordingly.

After the initial synchronization procedure is carried out the timing of the mobile device transmissions may change due to changes in propagation delay. The same result is achieved by movement of the mobile device as by the presence of a frequency error between oscillators of the mobile device and the base station. The timing advance loop adjusts for these changes in propagation delay. The procedure is as follows:

1. The base station estimates the changes in delay by the means of a delay estimation method.

2. The base station signals to the mobile device to adjust the transmission timing of the mobile device to compensate for the estimate change in propagation delay.

3. The mobile device makes the requested adjustment to the transmission timing.

In conventional approaches the base station measures the channel impulse response from a longer time window than would have been required without delay estimation. This has been done to in order to obtain information about the impulse response both before and after the expected time-of-arrival of the signal transmitted by the mobile device. The impulse response energy from before, on-time and after the expected time-of-arrival have also been averaged for a period of bursts. The decision to then signal the mobile device to either delay or advance its timing has been performed based on a maximum impulse response energy.

The conventional time alignment techniques are not optimum, and improvements are needed.

SUMMARY OF THE EXEMPLARY EMBODIMENTS

The foregoing and other problems are overcome, and other advantages are realized, in accordance with the non-limiting and exemplary embodiments of this invention.

In accordance with a first aspect of the exemplary embodiments of this invention a method includes measuring channel impulse response of a received signal event using at least two estimators; obtaining a channel estimate for each measured channel impulse response; averaging the obtained channel estimates over a plurality of received signal events and determining a timing adjustment in a direction indicated by a residual signal power.

In accordance with a second aspect of the exemplary embodiments of this invention there is provided a computer-readable memory medium that stores program instructions the execution of which results in operations that comprise measuring channel impulse response of a received signal event using at least two estimators; computing a channel estimate for each measured channel impulse response; averaging the computed channel estimates over a plurality of received signal events and determining a timing adjustment in a direction indicated by a residual signal power.

In accordance with a further aspect of the exemplary embodiments of this invention there is provided an apparatus that includes a radio frequency receiver and a timing adjustment unit that comprises at least two channel impulse response estimators, comprising an on-time estimator and at least one of an early estimator and a late estimator, and a calculation unit. The calculation unit is configurable to obtain a channel estimate for each measured channel impulse response and to average obtained channel estimates over a plurality of received signal events to determine a timing adjustment in accordance with residual signal power.

In accordance with another aspect of the exemplary embodiments of this invention there is provided an apparatus that includes means for receiving a radio frequency signal from a mobile communication unit and means for providing a portion of a timing advance loop that comprises at least first and second means for estimating channel impulse response including an on-time response and at least one of an early and a late response. The providing means further comprises means for obtaining a channel estimate for each measured channel impulse response, means for averaging the obtained channel estimates over a predetermined fixed number of frames/subframes or over a dynamically determined number of frames/subframes, and means for determining a timing adjustment in accordance with residual signal power.

BRIEF DESCRIPTION OF THE DRAWINGS

The foregoing and other aspects of the exemplary embodiments of this invention are made more evident in the following Detailed Description, when read in conjunction with the attached Drawing Figures, wherein:

FIG. 5 illustrates a conventional 47 sample long estimate (assuming 16QAM, rate 2/3, TU 5 MHz channel, 30 km/h);

FIG. 6 shows the use of the three estimator system in accordance with embodiments of this invention, applied under the same conditions as the conventional approach in FIG. 5;

FIG. 7 contrasts the conventional single estimate approach versus the multiple estimate approach, in accordance with the embodiments of this invention, for different modulation formats; and FIG. 8 illustrates the recovery of a lost estimation tap as the SNR increases.

DETAILED DESCRIPTION

Although the conventional methods discussed above are generally relatively low in complexity, there are certain performance issues associated therewith. For example, if the number of additional channel impulse response taps to be estimated is significant with respect to the total number of estimated channel taps, the performance loss is noticeable. As a non-limiting example, a loss of 0.3 dB or more has been detected in LTE simulations.

Figure 1:
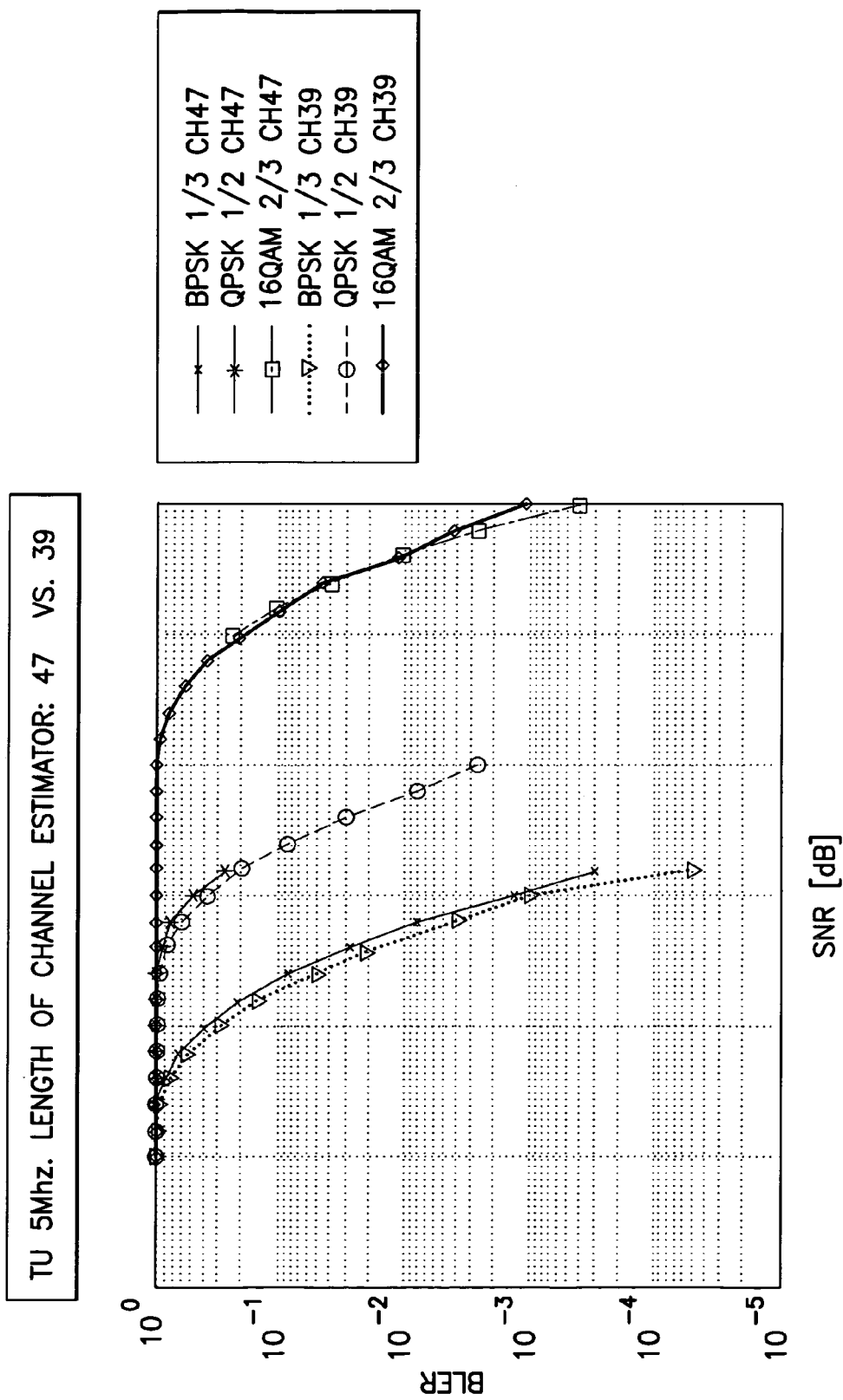
FIG. 1 is a graph that plots BLER versus SNR (arbitrary units) for a plurality of modulation types and depicts the loss in gain if a 47 sample channel estimator is used as opposed to a 39 sample channel estimator.

As an example, FIG. 1 plots BLER versus SNR for a plurality of modulation types and depicts the loss in gain if a 47 sample channel estimator is used as opposed to a 39 sample channel estimator.

In addition, there are certain problems associated with the use of the channel impulse response energy as the decision criterion. In those cases where some of the channel taps with large energy are not within the measurement window, a LSE-based estimator begins to amplify the noise. This causes a large increase in the impulse response noise level, causing the energy measurement to be misleading (a large energy results from the noise level increase).

Figure 9:
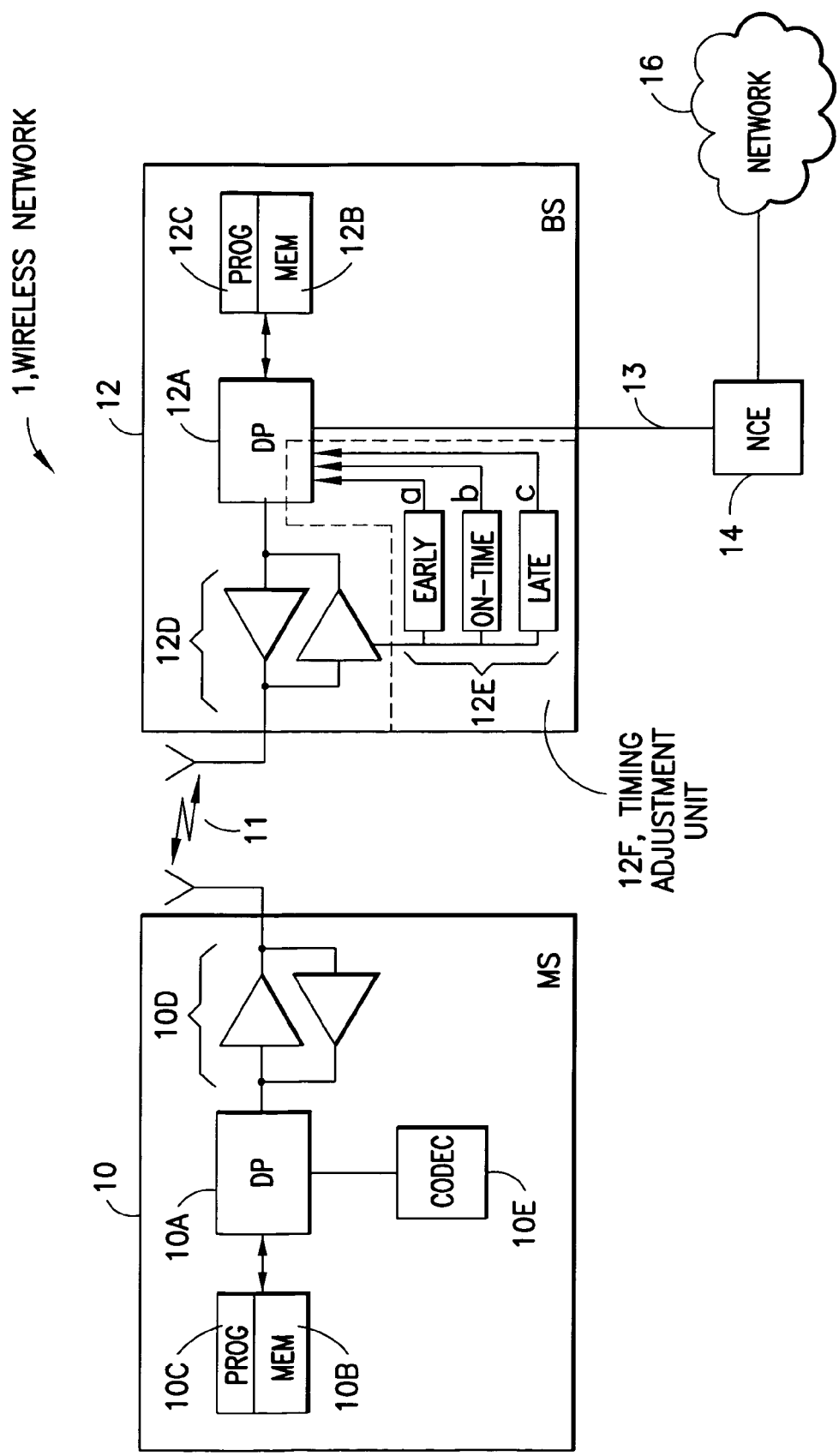
FIG. 9 is a block diagram of a device that is suitable for practicing the embodiments of this invention.

Reference is made first to FIG. 9 for illustrating a simplified block diagram of various electronic devices that are suitable for use in practicing the exemplary embodiments of this invention. In FIG. 9 a wireless network 1 is adapted for communication with a MS 10 via a BS 12. The network 1 may include a network control element (NCE) 14 that may provide connectivity to a network 16, such as a telecommunications network and/or the Internet. The MS 10 includes a data processor (DP) 10A, a memory (MEM) 10B that stores a program (PROG) 10C, and at least one suitable radio frequency (RF) transceiver 10D for bidirectional wireless communications with the BS 12, which also includes a DP 12A, a MEM 12B that stores a PROG 12C, and at least one suitable RF transceiver 12D. The BS 12 may be coupled via a data path 13 the NCE 14 that also includes a DP 14A and a MEM 14B storing an associated PROG 14C. At least the PROG 12C may be assumed to include program instructions that, when executed by the associated DP 12A, enable the electronic device to operate in accordance with the exemplary embodiments of this invention, as will be discussed below in greater detail.

The MS 10 may include a codec 10E and other functionality needed to operate for its intended purpose, such as for making voice calls, which may be VoIP calls. The BS 12 is shown to include, in association with the RF receiver portion of the transceiver 12D, channel estimators 12E, specifically an early (12E-a), on-time (12E-b) and a late (12E-c) channel estimator. These channel estimators operate on the sampled receive (Rx) signal (e.g., on samples resulting from an analog-to-digital conversion operation performed on the Rx signal). Also shown is a timing adjustment unit 12F, that may be considered to include functionality of the RF receiver part of the transceiver 12D, the estimators 12E, and at least a portion of the functionality of the DP 12A.

It is pointed out that while the estimators 12E are discussed below in the context of noise variance estimators, this is not a limitation upon the practice of this invention, as in other embodiments the estimators may be SNR estimators, or they may be bit error probability (BEP) estimators, as two non-limiting examples. Embodiments of a BEP estimation technique can be found in, as one example, U.S. Pat. No. 7,028,232 B2, Error Estimation Method and Apparatus, by Pekka Kyösti and Mikko Säily.

In general, the various embodiments of the MS 10 can include, but are not limited to, cellular telephones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The exemplary embodiments of this invention may be implemented by computer software executable by the DP 12A of the BS 12, or by hardware, or by a combination of software and hardware.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multi-core processor architecture, as non-limiting examples.

The exemplary embodiments of this invention pertain at least in part to a method characterized by (reference is also made to FIG. 10):

10A. A first step measures the channel impulse response using at least two, and possible all three, of the early, on-time and late estimators 12E shown in FIG. 9. All estimates comprise either the same or a different number of channel impulse response taps, and only the on-time estimate is used for detection. Thus, the on-time estimate is not corrupted with additional estimation noise from the early and late estimates, and no sensitivity loss is incurred.

10B. A next step computes at least two, and possibly three (depending on how many of the estimators were used in step 10A) different channel estimates (such as noise variance estimates) using the different impulse responses measured by at least two of the early, on-time and late estimators 12E.

10C. Another step averages the different channel estimates for a period of bursts.

10D. Another step uses the power of the residual signal as a criterion for deciding in which direction the timing should be adjusted. This may be implemented by using, as non-limiting examples, noise variance estimates or, in another embodiment, SNR estimates or, in another embodiment, BEP estimates as criterion for the residual signal power.

In the foregoing method the step of block 10A effectively measures the noise variance of the signal at two or more locations (e.g., early, on-time and late) on the time axis.

In the foregoing method the step of block 10B may be accomplished in various ways. In general, computing the noise variance can depend on the implementation of the receiver of the BS transceiver 12D. In a general sense obtaining the noise variance estimate uses a difference between a channel impulse response estimate and a smoothed channel impulse response estimate, where the smoothed channel impulse response estimate results from a function that emphasizes certain parts of the signal and de-emphasizes other parts of the signal. For a particular receiver embodiment that handles signals in the frequency domain the following equation may be used:

$$\text{noise\_variance\_estimate} = \text{mean}(\text{abs}(\text{channel\_estimate} - \text{smoother} * \text{channel\_estimate}))^2$$

where "mean" is the arithmetic mean, "abs" is absolute, and "smoother" is the filter function that emphasizes certain parts of the signal and de-emphasizes (dampens) other parts of the signal. This equation is applied in turn to at least two of the early, on-time and late channel estimates output by the estimators 12E. In the embodiment of FIG. 9 this computation may be performed by the data processor 12A, or it may be performed by dedicated hardware (e.g., a hardware unit comprising multipliers, etc.), or by a combination of the DP 12A and dedicated hardware (and/or firmware), all of which may be suitable embodiments for the timing adjustment unit 12F.

It should be noted that exemplary embodiments are not limited for use only in the frequency domain.

In the foregoing method the step of block 10C may be accomplished by averaging over some number of frames to obtain a timing decision. As a non-limiting example $200_C$ iterations (e.g., 100 frames, which may correspond to 200 subframes as in, for example, the LTE system) may be used. However, the number of iterations may also be made dynamic (variable, as opposed to a constant), which can be particularly useful in certain applications, such as in a VoIP application.

Figure 10:
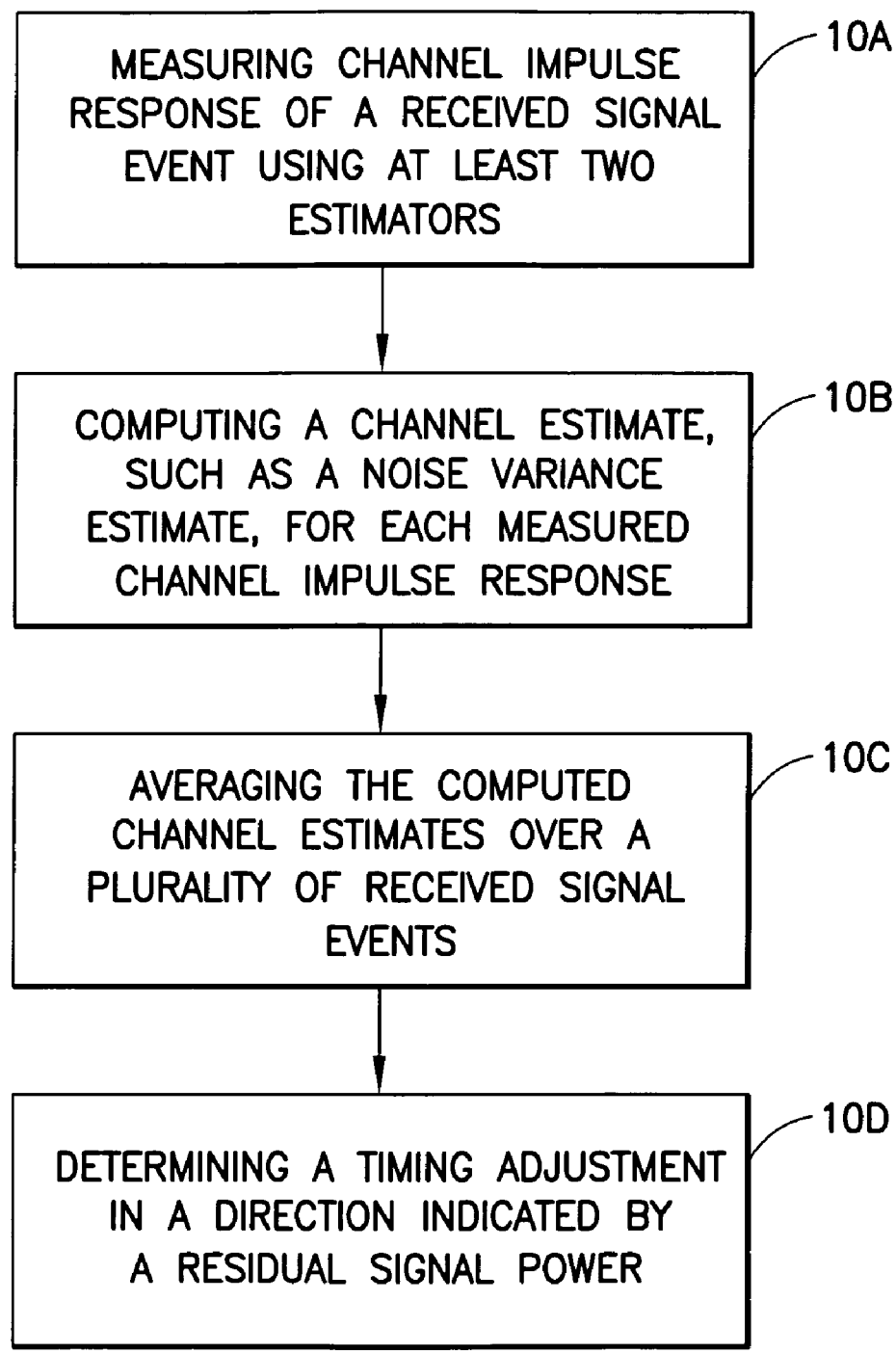
FIG. 10 is a logic flow diagram that illustrates a method, and the result of execution of computer program instructions by the data processor shown in FIG. 9.

The various blocks shown in FIG. 10 may be viewed as method steps, and/or as operations that result from operation of computer program code, and/or as a plurality of coupled logic circuit elements constructed to carry out the associated function(s).

Figure 2:
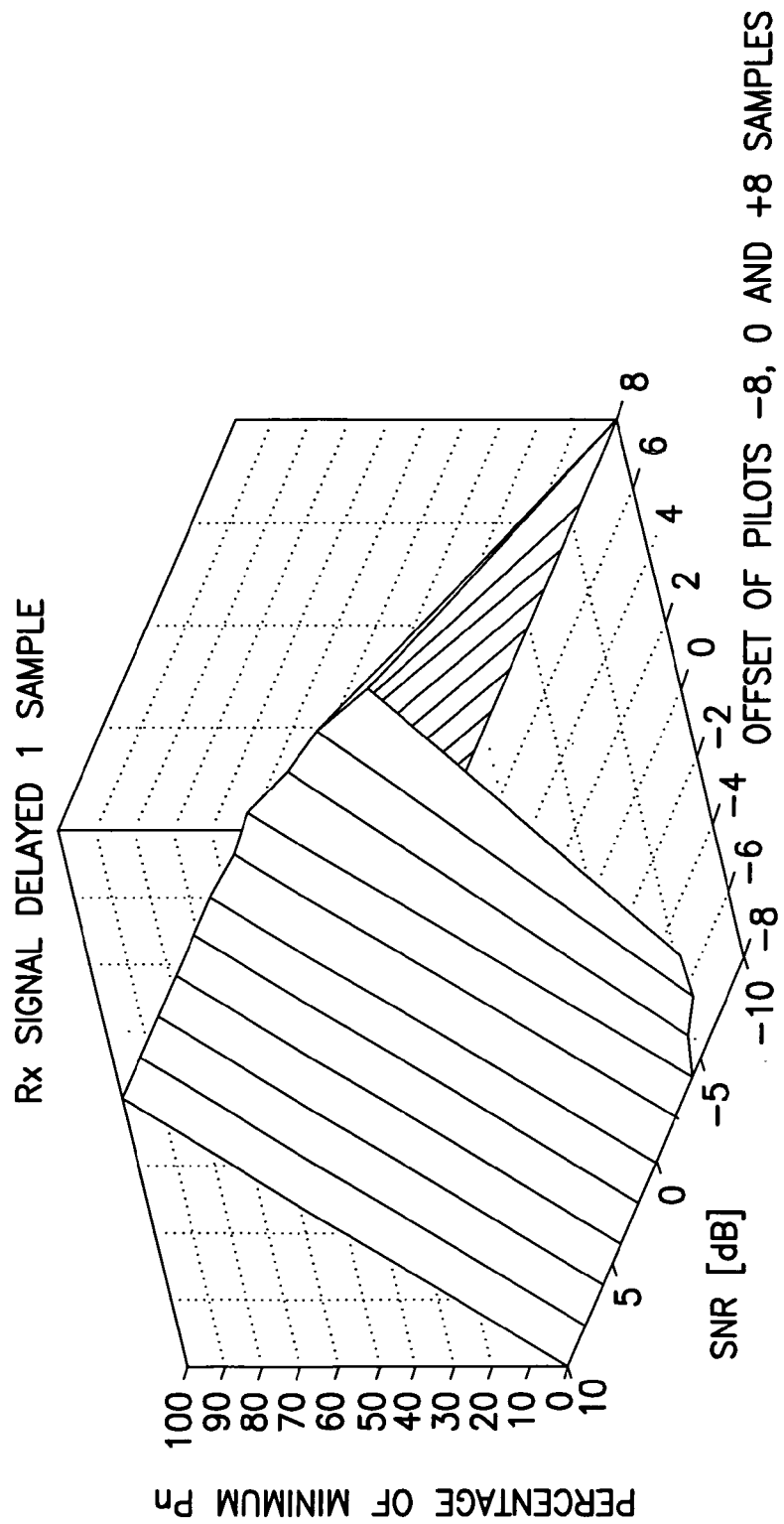
FIG. 2 illustrates residual signal power (measured in this case by using noise variance Pn) in an original situation, where the maximum is at the offset 0 (on-time estimator is selected).

FIG. 2 illustrates residual signal power (measured in this case by using noise variance Pn) where the maximum value is at the offset 0 (i.e., the on-time estimator 12E-b is selected). The Rx signal is delayed one sample in this Figure.

Figure 3:
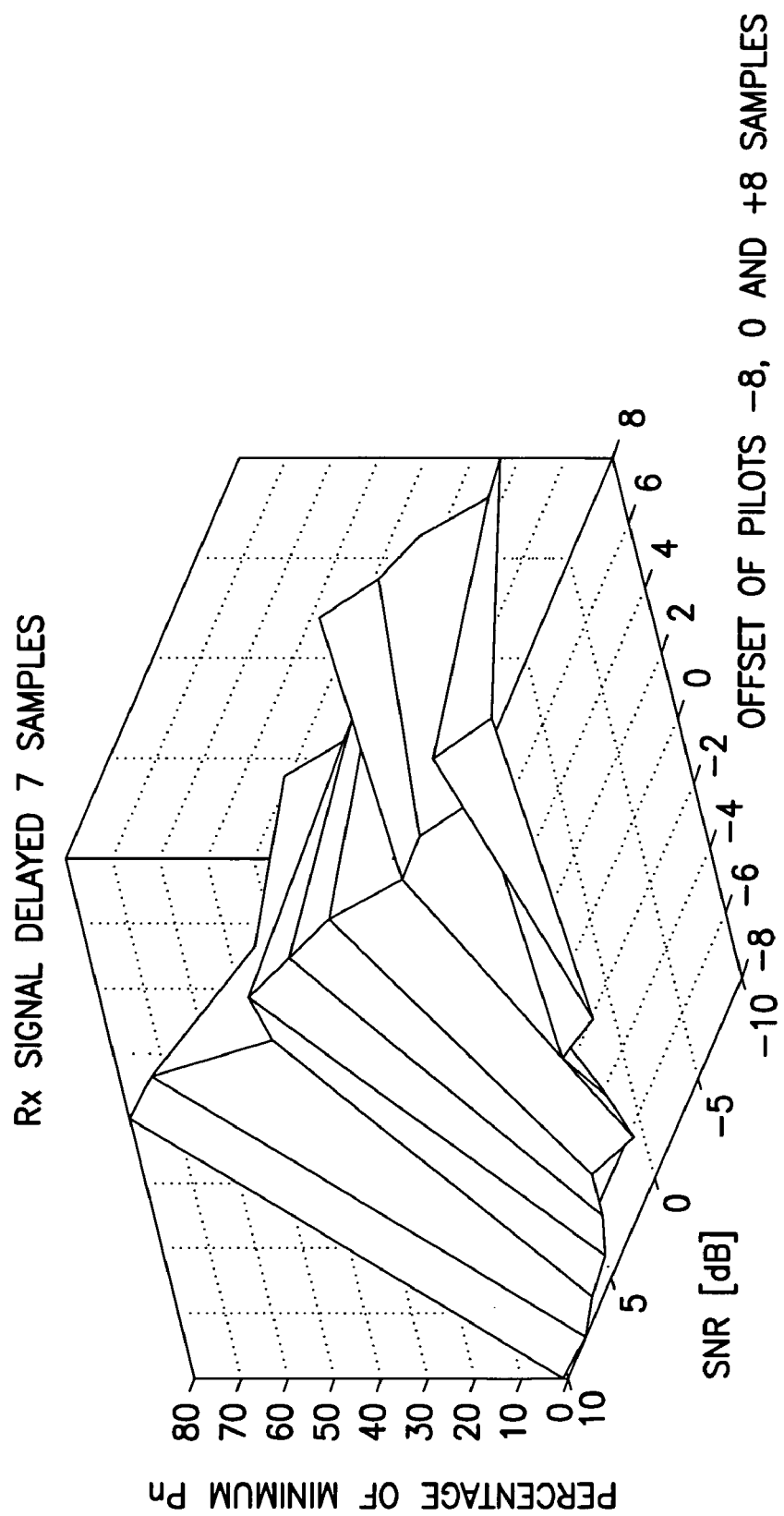
FIG. 3 illustrates that the maximum is typically at an offset 8, where a late estimator is effective, and where the sum of delay compensations directs the total delay compensation to a correct direction.

FIG. 3 illustrates that the maximum is typically at an offset value of 8, where the late estimator 12E-c is effective, and where the sum of delay compensations directs the total delay compensation in the correct direction. The Rx signal is delayed by seven samples in this Figure.

Figure 4:
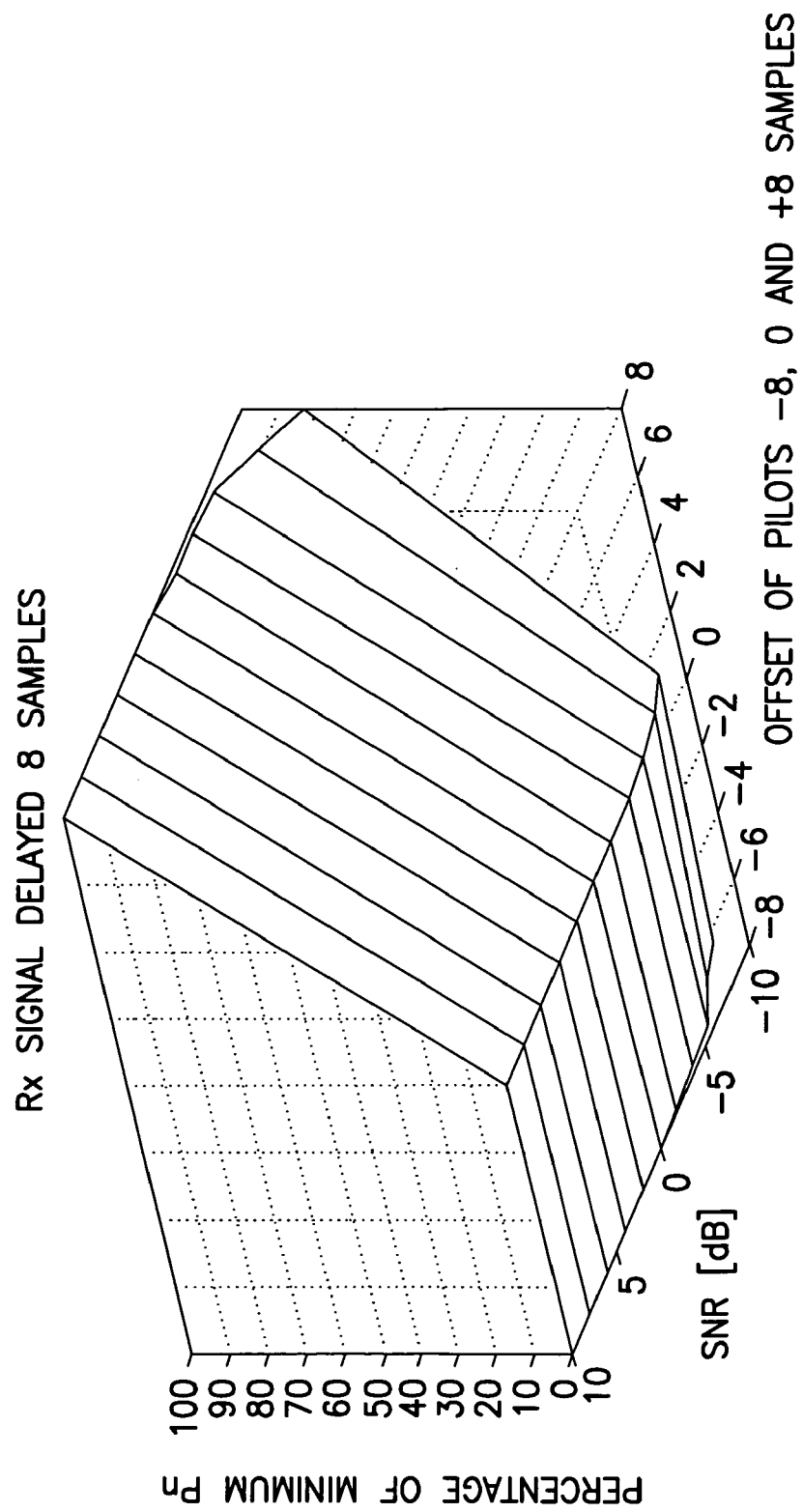
FIG. 4 illustrates that delays and offsets compensate one another in the case of the late estimator, resulting in all strongest taps being associated with the late estimator, which indicates very clearly that in which direction the delay should be corrected in the receiver of the network access device.

FIG. 4 illustrates that delays and offsets compensate one another in the case of the late estimator 12E-c, resulting in all strongest taps being associated with the late estimator. This may thus clearly indicate in which direction the delay should be corrected in the receiver of the BS 12. The Rx signal is delayed by eight samples in this Figure.

The method described above provides a readily implementable and algorithmically robust technique for performing the delay estimation for the timing advance loop.

According to simulations performed at least some conventional systems, even with a 5 MHz bandwidth, can lose the weakest tap. The exemplary embodiments of this invention operate correctly with a 5 MHz bandwidth Rx signal. In addition, and even if the weakest tap is lost, it can be regained if the SNR is increased, where as the conventional systems appear to be incapable of regaining the weakest tap once it is lost.

As was noted above, three separate channel estimates may be used, or less than three channel estimates may be used. For example, in one embodiment the on-time estimate is used with the early estimate and then at another time with the late estimate. This may be arranged so that approximately 50% of the time the early estimate is used, and the late estimate is used for the remaining time. This can be readily accomplished even at MS 10 speeds of 360 km/h. Note that a speed of 360 km/h means that the propagation delay changes about one sample during 500 subframes. One may, for example, 50 or 100 subframes before checking the propagation delay. Thus, while two additional channel estimates may be used (early and late), only one additional estimate is sufficient and, furthermore, need not be constantly updated.

In order to avoid making a "hard" decision concerning the three noise estimates (early, on-time and late) one may use a mass center (center-of-mass) method. As compared to use of the hard decision approach (where "the lowest noise variance wins"), the mass center approach counts "soft" decisions by recording the mass center of the noise variances. This enables the combination of different averaging periods so that averaging period becomes dynamic. As an example, averaging over 50 subframes is suitable. An additional factor may be used to control the dynamic integration time. The mass center method enables faster corrections of the propagation delay (in particular if there are significant differences between noise variance values for the early, on-time and late estimates, and it becomes possible to join separate measurements together.

Further with regard to the mass center method, this approach arises from the use of an analogy that the noise variances are considered to be located along a weightless rod (note again that the noise variances may instead be SNR or BEP estimates, as examples). The on-time estimator 12E-b is located at the middle of the rod, the early estimator 12E-a is located at one end of the rod and the late estimator 12E-c at the other end. Quantities and positions (torques) of the estimators 12E are determined when the center point of the estimators is defined for the rod in each averaging round. If a sliding average of the mass center exceeds a certain amount of offset from the middle of the rod, then the timing advance is corrected so that center of mass will be moved back to the middle of the rod.

The use of this mass center method makes the number of averaging rounds dynamic, and thereby avoids problems resulting from the use of a fixed number of averaging rounds. If all averaging rounds move the sliding average of the center of mass in the same direction then the correction of the timing advance will occur sooner than would occur if the number of averaging round were fixed. In addition, the larger the differences between the estimators 12E the sooner the timing advance can be corrected.

Further in accordance with the exemplary embodiments of this invention the system is enabled to again locate the weakest tap when the SNR increases sufficiently by varying the width of the detector (i.e., by varying the distance between the early, on-time and late estimators 12E). For example, assume that the distance is normally set at −2 and +2 samples (relative to the on-time sample), and that this distance is maintained for four averaging periods followed by the use of −20 and +20 samples for one averaging period, and that this is done for five period cycles.

However, it is noted that varying the detector width may not be needed in all embodiments, as the use of the −2 to +2 sample window has been found to again locate the weakest tap after the SNR increases from a relatively low value.

Certain simulation results are now discussed with reference to FIGS. 5-8. For this discussion assume that a simulator generates −10 to +10 samples saw-tooth curve for the timing advance, and that the timing advance changes by one sample every 500 subframes. In this scenario the detector attempts to track the change in the timing advance. The error+correction curves shown in FIGS. 5, 6 and 8 should be zero (actually −1 is the target due to particular simulator operations), meaning that all generated timing advance is eliminated.

Figure 5:
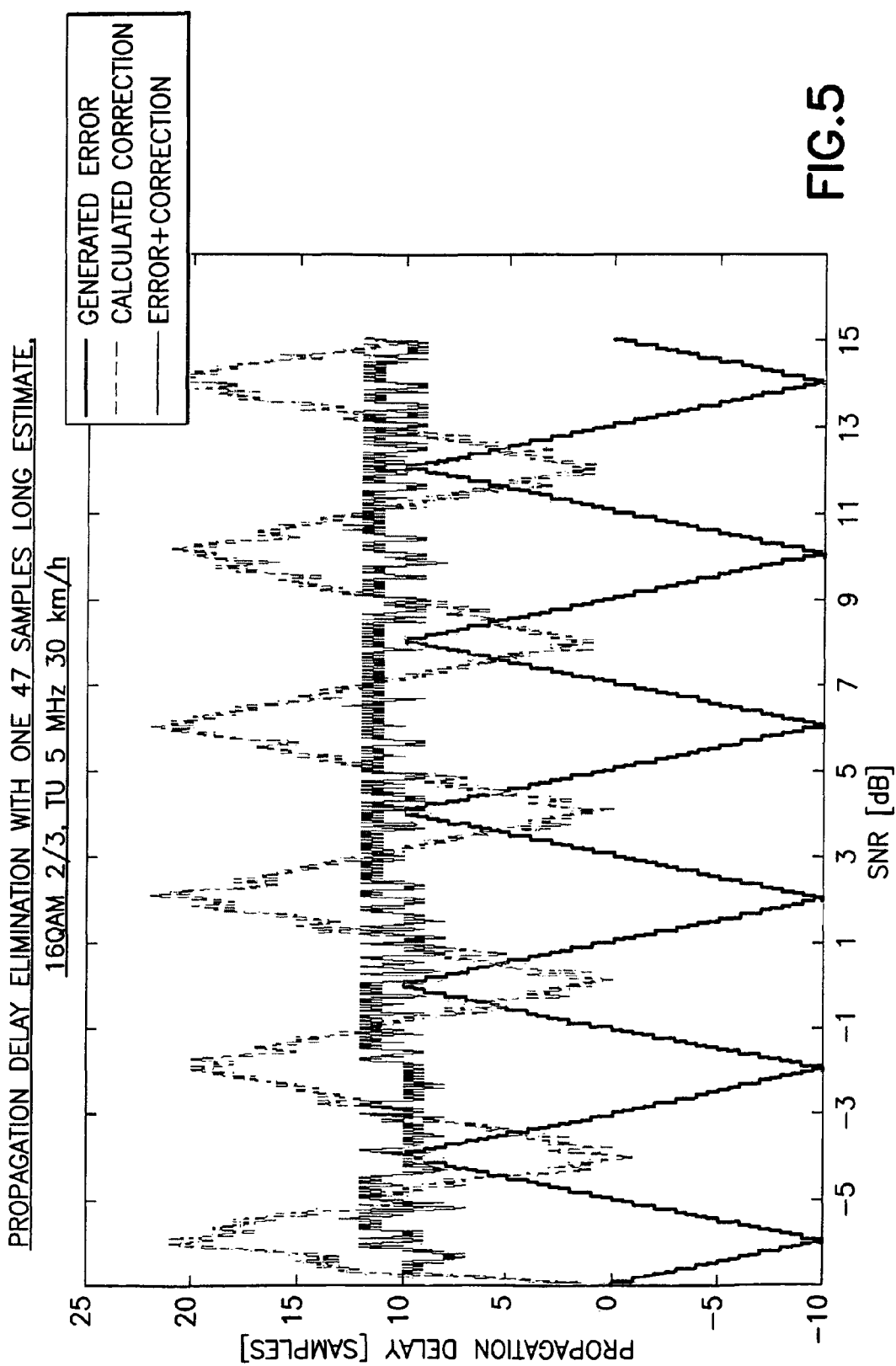
FIGS. 5-8 are graphs that depict results of simulations, where
Figure 6:
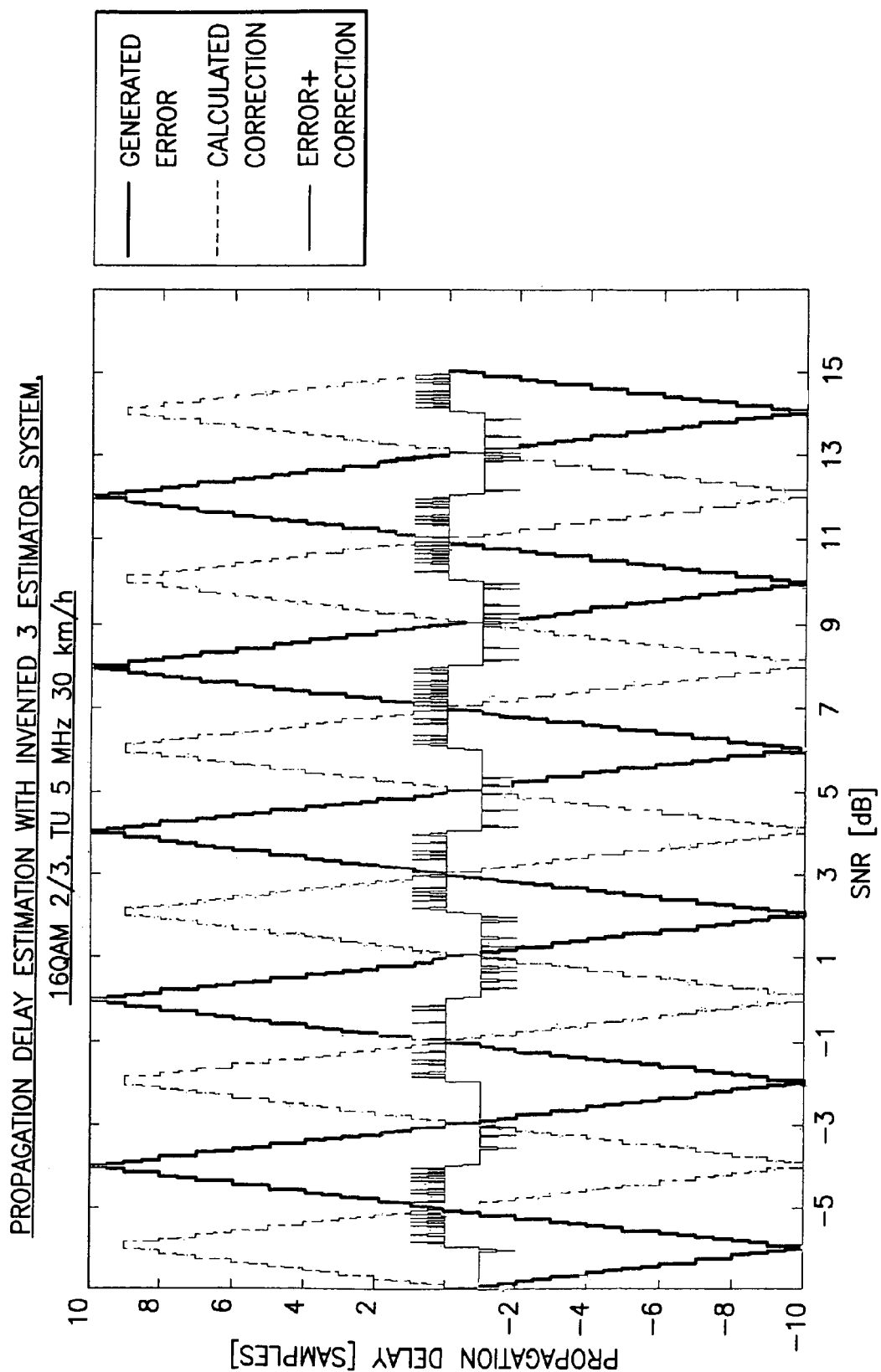
Figure 7:
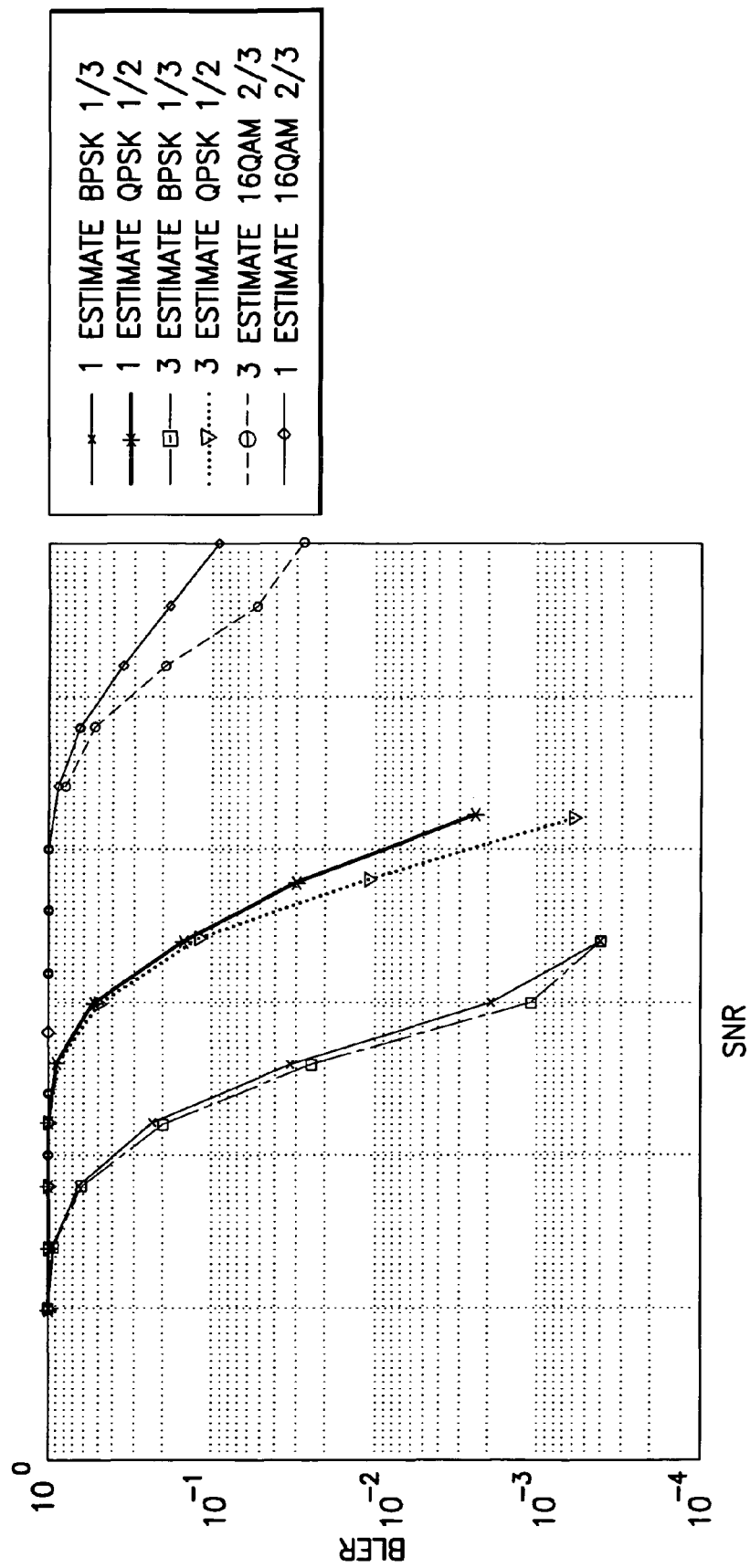

FIG. 5 illustrates a conventional 47 sample long estimate (assuming 16QAM, rate 2/3, TU 5 MHz, 30 km/h). Note in FIG. 5 that the conventional approach results in the system remaining about +10 samples off from the correct position. In the TU-channel that is used this implies that the weakest tap is outside of the receiver, and results in a significant gain loss in the case of the 16QAM FIG. 6 shows the use of the three estimator system in accordance with embodiments of this invention, applied under the same conditions as the conventional approach in FIG. 5, and shows the superior operation that is achieved as compared to the conventional approach of FIG. 5.

In the case of narrow bandwidth operation the improved system in accordance with this invention may also lose the weakest tap, if the SNR is low, but is capable of locating the weakest tap again if the SNR increases. This is an important feature, since the loss of the weakest tap in the TU-channel implies only about a 0.1-0.3 dB gain loss in the case of BPSK (BPSK is used when SNR is low), but a much more significant gain loss when 16QAM is used, i.e., when the SNR is high. This can be clearly seen in the graph of FIG. 7, which contrasts the conventional 47 sample long single estimate for BPSK, QPSK and 16QAM modulation approaches with the three estimate approach (BPSK and QPSK).

Figure 8:
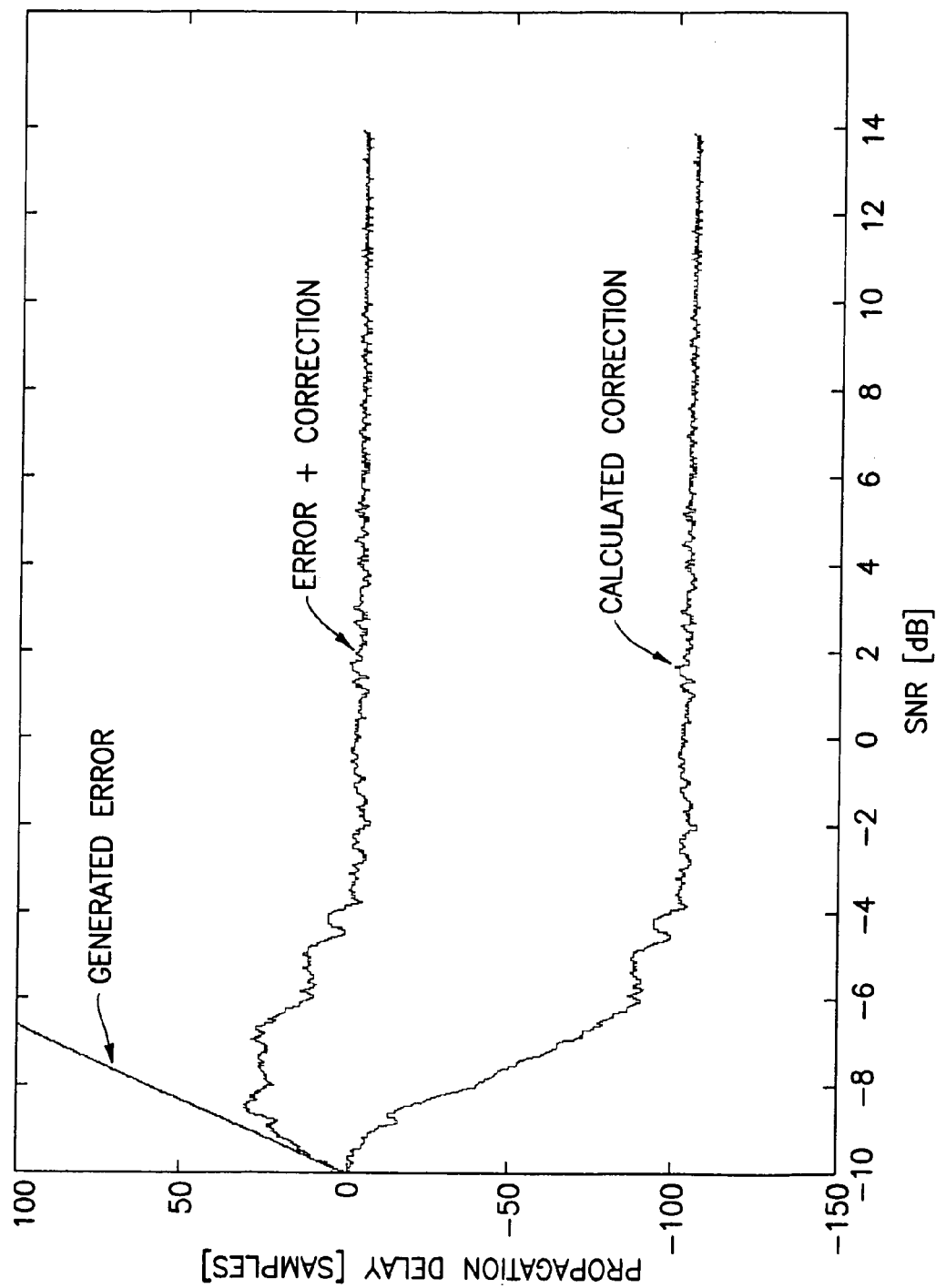

FIG. 8 illustrates the operation of the system finding the lost (weakest) tap as the SNR increases (and assumes a TU channel of about 416 kHz bandwidth).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the inventions may be practiced in various components such as integrated circuit chips and modules. The design of integrated circuits is by and large a highly automated process. Complex and powerful software tools are available for converting a logic level design into a semiconductor circuit design ready to be fabricated on a semiconductor substrate. Such software tools can automatically route conductors and locate components on a semiconductor substrate using well established rules of design, as well as libraries of pre-stored design modules. Once the design for a semiconductor circuit has been completed, the resultant design, in a standardized electronic format (e.g., Opus, GDSII, or the like) may be transmitted to a semiconductor fabrication facility for fabrication as one or more integrated circuit devices.

Various modifications and adaptations may become apparent to those skilled in the relevant arts in view of the foregoing description, when read in conjunction with the accompanying drawings and the appended claims. As but some examples, the use of different, similar or equivalent calculation and averaging techniques, sample offsets between the on-time estimator and the early/late estimators, number of estimator taps and the like may be attempted by those skilled in the art. However, all such and similar modifications of the teachings of this invention will still fall within the scope of this invention.

Further, while the exemplary embodiments have been described above in the context of various wireless communication systems, such as the E-UTRAN (UTRAN-LTE) system, it should be appreciated that the exemplary embodiments of this invention are not limited for use with only this one particular type of wireless communication system, and that they may be used to advantage in wireless communication systems other than those specifically referred to above.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the examples of this invention may be used to advantage without the corresponding use of other features. As such, the foregoing description should be considered as merely illustrative of the principles, teachings, examples and exemplary embodiments of this invention, and not in limitation thereof.

What is claimed is:

1. A method, comprising:
    measuring a channel impulse response of a received signal event using at least two estimators;
    obtaining a channel estimate for each measured channel impulse response, where obtaining the channel estimate obtains a noise variance estimate using a difference between a channel impulse response estimate and a smoothed channel impulse response estimate, where the smoothed channel impulse response estimate results from a function that emphasizes certain parts of the signal and de-emphasizes other parts of the signal;
    averaging the obtained channel estimates over a plurality of received signal events; and
    determining a timing adjustment in a direction indicated by a residual signal power.

2. The method of claim 1, where a first estimator is an on-time channel impulse response estimator, and where a second estimator is an early channel impulse response estimator.

3. The method of claim 1, where a first estimator is an on-time channel impulse response estimator, and where a second estimator is a late channel impulse response estimator.

4. The method of claim 1, where averaging occurs over a predetermined fixed number of frames/subframes.

5. The method of claim 1, where averaging occurs over a dynamically determined number of frames/subframes.

6. The method of claim 1, where the at least two estimators are temporally offset from one another by at least two received signal sample times.

7. The method of claim 1, where averaging comprises using a center of mass technique.

8. The method of claim 1, where the estimators are multi-tap estimators.

9. A computer-readable memory medium that stores program instructions the execution of which results in operations that comprise:
    measuring channel impulse response of a received signal event using at least two estimators;
    computing a channel estimate for each measured channel impulse response, where computing the channel estimate computes a noise variance estimate using a difference between a channel impulse response estimate and a smoothed channel impulse response estimate, where the smoothed channel impulse response estimate results from a function that emphasizes certain parts of the signal and de-emphasizes other parts of the signal;
    averaging the computed channel estimates over a plurality of received signal events; and
    determining a timing adjustment in a direction indicated by a residual signal power.

10. The computer-readable medium of claim 9, where a first estimator is an on-time channel impulse response estimator, and where a second estimator is at least one of an early channel impulse response estimator and a late channel impulse response estimator.

11. The computer-readable medium of claim 9, where averaging occurs over a predetermined fixed number of frames/subframes.

12. The computer-readable medium of claim 9, where averaging occurs over a dynamically determined number of frames/subframes.

13. The computer-readable medium of claim 9, where the at least two estimators are temporally offset from one another by at least two received signal sample times.

14. The computer-readable medium of claim 9, where averaging comprises using a center of mass technique.

15. The computer-readable medium of claim 9, where the estimators are multi-tap estimators.

16. An apparatus, comprising:
    a radio frequency receiver; and
    one or more processors; and
    one or more memories including computer program code,
    the one or more memories and the computer program code configured to, with the one or more processors, cause the apparatus to perform at least the following:
    measuring a channel impulse response of a received signal event using at least two estimators;
    obtaining a channel estimate for each measured channel impulse response, where obtaining the channel estimate obtains a noise variance estimate using a difference between a channel impulse response estimate and a smoothed channel impulse response estimate, where the smoothed channel impulse response estimate results from a function that emphasizes certain parts of the signal and de-emphasizes other parts of the signal; and
    averaging the obtained channel estimates over a plurality of received signal events; and
    determining a timing adjustment in accordance with residual signal power.

17. The apparatus of claim 16, where said averaging averages over a predetermined fixed number of frames/subframes, or averages over a dynamically determined number of frames/subframes.

18. The apparatus of claim 16, where the at least two channel estimators are temporally offset from one another by at least two received signal sample times.

19. The apparatus of claim 16, embodied in a network access node of a wireless communication system.

20. An apparatus, comprising:
    means for receiving a radio frequency signal from a mobile communication unit; and
    means for providing a portion of a timing advance loop comprising at least first and second means for estimating channel impulse response including an on-time response and at least one of an early and a late response, said providing means further comprising means for obtaining a channel estimate for each measured channel impulse response, where the means for obtaining the channel estimate obtains a noise variance estimate using a difference between a channel impulse response estimate and a smoothed channel impulse response estimate, where the smoothed channel impulse response estimate results from a function that emphasizes certain parts of the signal and de-emphasizes other parts of the signal, means for averaging the obtained channel estimates over a predetermined fixed number of frames/subframes or over a dynamically determined number of frames/subframes, and means for determining a timing adjustment in accordance with residual signal power.

21. The apparatus of claim 20, embodied in a network access node of a wireless communication system.

* * * * *